UNITED STATES PATENT OFFICE.

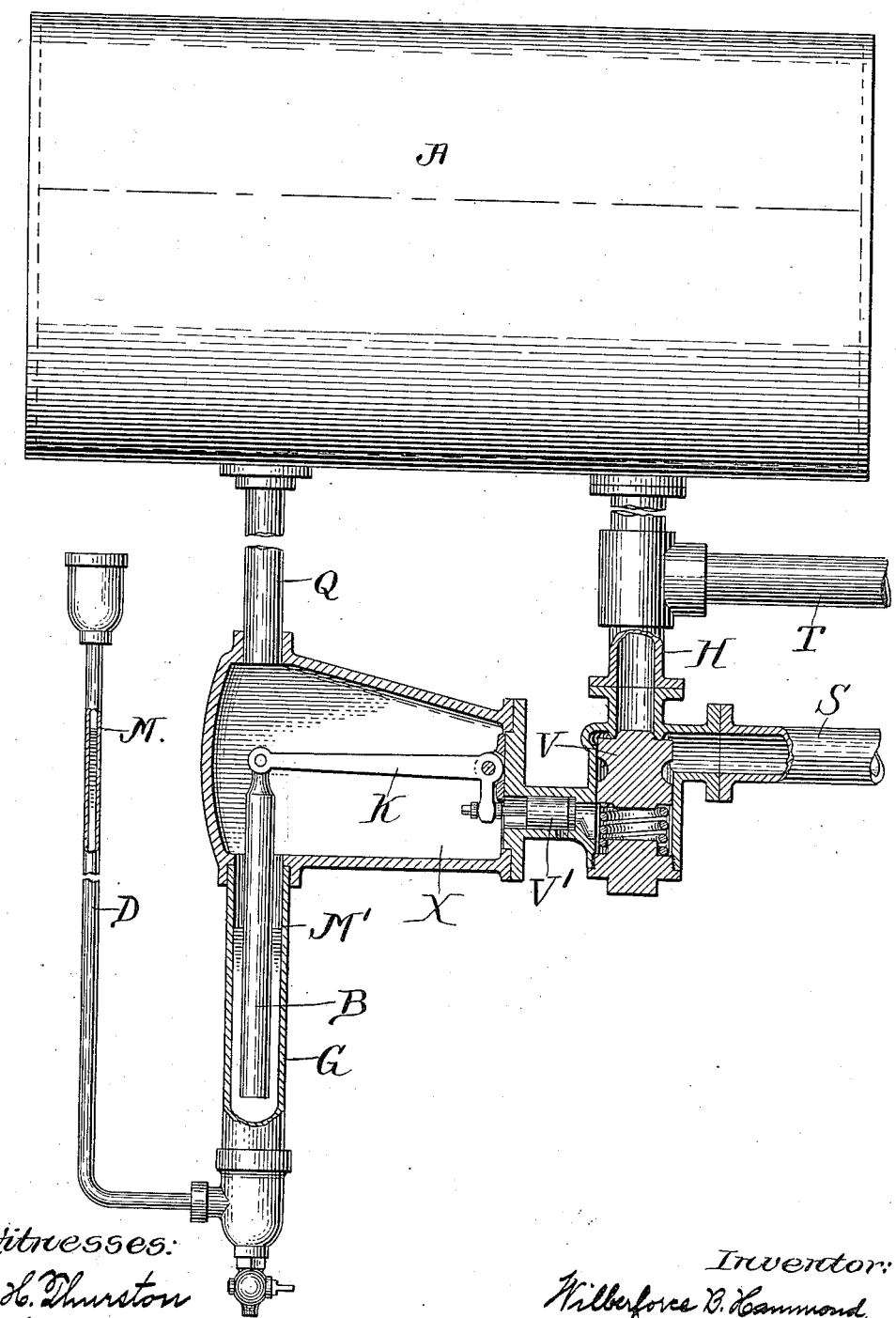

WILBERFORCE B. HAMMOND, OF BOSTON, MASSACHUSETTS, ASSIGNOR TO GENERAL FIRE EXTINGUISHER COMPANY, OF NEW YORK, N. Y., A CORPORATION OF NEW YORK.

VALVE-REGULATING MECHANISM.

1,041,272.          Specification of Letters Patent.       Patented Oct. 15, 1912.

Application filed October 18, 1906. Serial No. 339,461.

*To all whom it may concern:*

Be it known that I, WILBERFORCE B. HAMMOND, of Boston, in the county of Suffolk and State of Massachusetts, have invented certain new and useful Improvements in Valve-Regulating Mechanism; and I do hereby declare the following specification, taken in connection with the accompanying drawings, forming a part of the same, to be a full, clear, and exact description thereof.

The invention relates to circulating or distributing systems, and more especially to means for maintaining a pressure or level in the system lower than the level or pressure in the supply for the system.

The invention consists primarily in the employment of a valve between the supply and the system and in controlling this valve through the movement of a fluid column which balances the pressure in the system. The intermediate devices between the valve and the fluid column are so constructed and arranged that a variation in the height of the fluid, due to the falling of the pressure in the system below a predetermined point, opens the valve which remains open until the height of the fluid column is restored by the return of the system pressure to normal when the valve closes and remains closed until the system pressure again falls.

The invention further consists in the employment for the controlling column of a fluid of greater specific gravity than the fluid under pressure in the system, whereby the height of the controlling column is correspondingly reduced. Thus when the fluid in the system is water mercury is preferably employed for the fluid column, while if the fluid in the system be air, then any suitable liquid may be conveniently employed for the fluid column.

The regulating mechanism may be installed or applied to existing systems with little expense and without inconvenience, since it may be located in any convenient position where it is readily accessible for inspection or adjustment. The operation of the mechanism being controlled by the pressure in the system is unaffected by variations in the pressure of the supply so that a low pressure may be accurately maintained in a system connected with a variable high pressure supply.

The various features of the invention will be understood from the following detailed description of the apparatus indicated in sectional elevation in the drawing.

In this apparatus the invention is applied to a system in which the pressure depends upon the level of the water in an elevated pressure tank, indicated at A. The pressure tank communicates with the supply pipe S through a pipe H, the communication between the tank and supply being controlled by a valve V. A pipe T leads from the pipe H to the other parts of the system so that the hydraulic head or pressure in the system will depend upon the level of the water in the tank A.

In practicing my invention as shown in the drawings I control the valve V through which the system is supplied with water from a high pressure supply to maintain the level of the water in the tank A through the movement of a fluid column which balances the pressure due to the level of the water in the tank A. This fluid column is contained within a small vertical pipe D the lower end of which communicates with a somewhat larger pipe G extending downward from the casing X. The pipe G forms a fluid chamber within which is a float bar B which extends upward into the casing X and is connected with a valve controlling lever K. The chamber X is in communication with the pressure tank A through a pipe Q so that the fluid in the pipe G is subjected to a pressure dependent upon the level of the water in the tank. This pressure is balanced by the fluid column in the pipe D, the level M of the fluid in the pipe D being higher than the level M' on the fluid in the pipe G. The difference between the height of the fluid in the two pipes will depend upon the pressure upon the fluid in the pipe G. By regulating the amount of fluid in the pipes the fluid in the pipe G may be made to stand at M' with any given pressure upon the surface of the fluid.

The valve V may be of any suitable construction, the opening and closing of which is controlled by the operation of the lever K. For instance the valve may be a "Foster" valve, of the type shown in the patent to Foster #548,977, October 29, 1895, the opening and closing of which is controlled by an auxiliary valve V' operated by the lever K. After the amount of fluid in the pipes D and G has been regulated to maintain the level M′ in the pipe G with a given level of water in the tank A, the float B and lever K will remain in position to hold the auxiliary valve V′ closed, as indicated in the drawings, so long as the level in the tank A is maintained. Should the level in the tank A fall, thus reducing the pressure in the system, the fluid column in the pipe D will also fall, thus raising the level of the fluid in the pipe G. This movement of the fluid will lift the float B, thus operating the auxiliary valve V′ so that the valve V is opened. Water will now flow from the high pressure supply pipe S into the system until the level in the tank A is restored. As the water in the tank A returns to its normal level, the pressure on the surface of the fluid in the pipe G will also return to normal, so that the fluid will return to the level M′ indicated in the drawing. As the fluid returns to this level, the float B will fall, closing the valve V′ so that the valve V will close, thus cutting off the communication between the system and the supply pipe S. The valve will remain closed until the level of the water in the tank A is again lowered when the valve will be again opened to restore the water level and the pressure in the system. Thus a pressure is maintained in the system which is lower than the pressure in the supply and is unaffected by variations in the supply pressure.

The valve regulating mechanism may be applied to various systems for circulating or distributing water or other fluids where it is desirable to maintain a pressure in the system below the pressure in the supply, and is not confined in its use to systems in which the pressure is dependent upon the level of the fluid in an elevated tank or stand pipe. The invention may be used with especial advantage in such systems, however, since the valve and regulating mechanism may be located in any convenient position below the level of the fluid in the tank or stand pipe. For instance the mechanism may be located in the boiler or pump room where it may be inspected or adjusted and where the conditions for reliable operation are favorable.

When mercury is employed for the controlling column the float may be a solid metal bar which is immersed in the water while it floats in the mercury, and is not therefore subject to the disadvantages of the ordinary hollow floats used in regulating valves by the water level in a tank or chamber.

Certain features of the invention may be applied with advantage in any system where it is desired to open the communication between the system and supply whenever the pressure in the system varies beyond a predetermined point. For instance a regulating mechanism arranged as shown in the drawings might be applied to any system wherein it is desired to open the supply valve only when the system pressure falls below a certain point, or by varying the arrangement might be applied to a system where it is desired to open the supply valve only when the system pressure exceeded a certain amount.

It will be seen that when the controlling column is formed of a fluid of greater specific gravity than that of the fluid whose pressure is controlled and a float is employed for controlling the supply valve, the two fluids are in direct contact with each other and the float is immersed in one of said fluids while it floats in the other.

What I claim as my invention and desire to secure by Letters Patent is:

1. The combination, with a system and a valve for regulating the supply thereto, of a fluid column of greater specific gravity than the fluid in the system and serving to balance the pressure in the system, and devices embodying a float intermediate said column and valve for opening the valve upon the reduction of the pressure in the system, and closing said valve upon the return of the system pressure to normal.

2. The combination, with a system and a valve for controlling the supply thereto, of a chamber containing a fluid subjected to the pressure in the system, a fluid column balancing said pressure, a float in said chamber, and operative connections between the float and valve.

3. The combination, with a system and a valve for controlling the supply thereto, of a chamber containing a fluid subjected to the pressure in the system, a fluid column balancing said pressure, a float in said chamber, and operative connections between the float and valve for opening and closing the valve.

4. The combination, with a system and a valve for regulating the supply thereto, a fluid chamber connected with the system, a fluid column balancing the pressure in said chamber, a float in said chamber and operative connections between said float and valve.

5. The combination, with a system, of a supply valve therefor held closed by the pressure in the supply, an auxiliary valve for controlling the opening of said supply valve, a fluid chamber connected with the system, a fluid column balancing the pressure in said chamber, and a float in said chamber connected with said auxiliary valve.

6. The combination, with a system containing a fluid, a fluid column of greater specific gravity in direct contact with the fluid in the system, and a float arranged to float in said fluid of greater specific gravity and to extend into the fluid in the system, said float serving to control the supply of fluid to said system.

7. The combination, with a system containing a fluid under pressure, a fluid column of greater specific gravity in direct contact with the fluid in the system, and a float arranged to float in said fluid of greater specific gravity and to extend into the fluid in the system, said float serving to control the supply of fluid to said system to maintain the pressure therein.

WILBERFORCE B. HAMMOND.

Witnesses:
    W. H. THURSTON,
    J. H. THURSTON.

---

Copies of this patent may be obtained for five cents each, by addressing the "Commissioner of Patents, Washington, D. C."